UNITED STATES PATENT OFFICE.

FRANCIS M. JAQUES, OF NEW LONDON, CONNECTICUT.

COUGH-SIRUP.

SPECIFICATION forming part of Letters Patent No. 408,486, dated August 6, 1889.

Application filed April 23, 1889. Serial No. 308,314. (No specimens.)

*To all whom it may concern:*

Be it known that I, FRANCIS M. JAQUES, a citizen of the United States, residing at New London, in the county of New London and State of Connecticut, have invented a new and useful Cough-Sirup for Treatment of Coughs, Colds, Hoarseness, Sore and Inflamed Lungs, and all Bronchial Troubles, of which the following is a specification.

My cough-sirup consists of the following ingredients, combined in the proportions stated: Rock polypody-root, (*Polypodium vulgum*,) five ounces; extract licorice, six ounces; wild-cherry bark, (*Prunus Virginiana*,) one and one-half ounce; hoarhound-herb, (*Marrubium*,) one and one-fourth ounce; rock-candy, five pounds; granulated sugar, eleven pounds; glycerine, three pints; rye whisky, one-half pint.

In making the sirup the herbs are steeped in water for three hours and then strained and pressed. The sugar is then added, then the candy, and then the licorice, and the mixture boiled to a sirup. The sirup is then filtered and the glycerine and whisky added. The product should be bottled and corked while warm.

The ingredients mixed in the proportions heretofore set forth should yield about three gallons of sirup.

In use one table-spoonful of the sirup should be taken three times a day after meals. In extreme cases the doses may be taken oftener.

Spanish licorice is preferably employed.

Having thus described my invention, what I claim as new, and desire to secure by Letters Patent, is—

The herein-described cough-sirup, consisting of rock polypody, licorice, wild-cherry bark, hoarhound-herb, rock-candy, granulated sugar, glycerine, and rye whisky, in the proportions specified.

FRANCIS M. JAQUES.

Witnesses:
E. W. CADY,
EDGAR TATE.